United States Patent [19]

Blesser et al.

[11] Patent Number: 4,638,119
[45] Date of Patent: Jan. 20, 1987

[54] POSITION INDICATING APPARATUS FOR USE IN A DIGITIZING TABLET SYSTEM

[75] Inventors: Barry A. Blesser, Raymond, N.H.; Thomas C. Prentice, West Newton, Mass.

[73] Assignee: Pencept, Inc., Waltham, Mass.

[21] Appl. No.: 672,310

[22] Filed: Nov. 16, 1984

[51] Int. Cl.⁴ .............................................. G08C 21/00
[52] U.S. Cl. ...................................................... 178/19
[58] Field of Search .............................. 178/18, 19, 20; 340/706

[56] References Cited

U.S. PATENT DOCUMENTS

| | | | |
|---|---|---|---|
| 3,618,019 | 11/1971 | Nemirovsky et al. | 178/18 |
| 3,647,963 | 3/1972 | Bailey | 178/18 |
| 3,700,809 | 10/1972 | Nadon | 178/18 |
| 3,705,956 | 12/1972 | Dertouzos | 178/18 |
| 3,873,770 | 3/1975 | Ioannou | 178/18 |
| 4,213,005 | 7/1980 | Cameron | 178/18 |
| 4,240,065 | 12/1980 | Howbrook | 340/146 |
| 4,289,927 | 9/1981 | Rodgers | 178/19 |
| 4,318,096 | 3/1982 | Thornburg et al. | 340/706 |
| 4,368,351 | 1/1983 | Zimmer | 178/19 |
| 4,491,688 | 1/1985 | Schaub et al. | 178/18 |

Primary Examiner—Stafford D. Schreyer
Attorney, Agent, or Firm—Robert F. O'Connell; Robert M. Asher

[57] ABSTRACT

A position indicating implement is disclosed having a first coil connected to a current source and a second coil inductively coupled with the first coil. A capacitor is connected in series with the second coil so that the current in the first coil induces a phase shifted current in the second coil. A tip extends from the barrel of the position indicating implement of the present invention. The tip is designed for placement on and movement over a digitizing tablet. A switch has been located near the tip so that it is easily accessible to a user's finger while holding the implement.

The power source providing an alternating current to the first coil includes a digital switching circuit for producing a step function which approximates a sine wave and lacks any components at the second, third, fourth, fifth and sixth harmonics. The step function is filtered to produce a sine wave for delivery to the first coil. The switch near the tip of the implement may be used as a mouse switch so that the position indicating implement may be used as a mouse to indicate relative position rather than absolute position. Remote signaling may be accomplished by providing a switch in the circuit of the second coil. Calibration of the phase shift between the fields of the two coils may be accomplished by providing a line from the circuit of the second coil.

34 Claims, 7 Drawing Figures

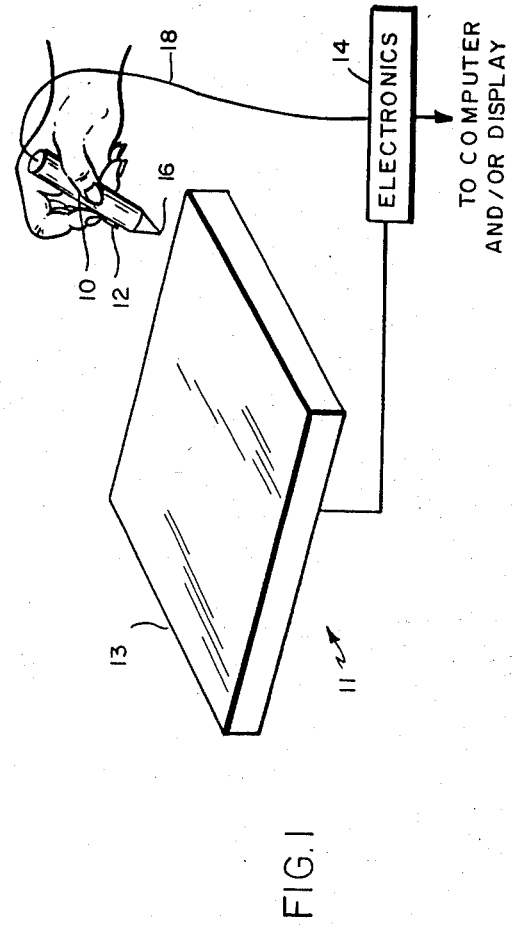
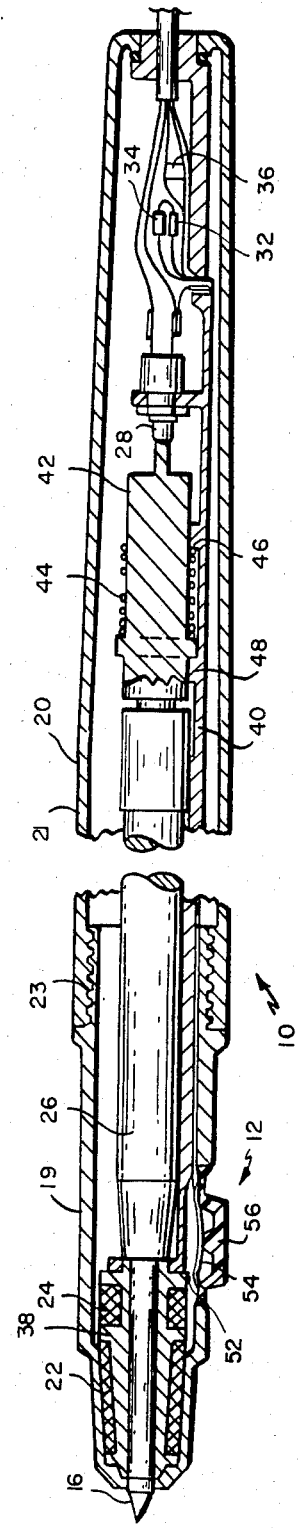
FIG.1
FIG.2

POSITION INDICATING APPARATUS FOR USE IN A DIGITIZING TABLET SYSTEM

BACKGROUND OF THE INVENTION

The present invention relates to a position indicating apparatus and more particularly to an electronic pen having two electric coils near its tip which are detected by a digitizing tablet.

Digitizing tablet systems are well known in the art and are used in a variety of applications These systems generally include a tablet, a position indicating implement and associated electronics for producing some form of interaction between the implement and the tablet from which is derived digital data signals representing the position of the implement on the tablet.

In a number of these systems, the tablet contains a grid of conductive elements and the implement contains an electric coil. Inductive type of interaction between the coil and the implement and the grid and the tablet is achieved by energizing either the coil or the grid with an AC voltage signal and then measuring the voltage signal induced in the other elements In other systems, capacitive type coupling with the grid and the tablet is achieved by using a flat conductive disk as the implement in place of the coil. In addition to the conductive electric coil, the implement usually contains either a ball point pen or a pencil with the tip of the pen or the pencil terminating at the tip of the implement so that the implement can write or draw on a surface as its position is being monitored. In some digitizing tablet systems, the implement is held in the hand of the user so that the user may actually write on a sheet of paper for instance, covering the digitizing tablet grid.

Since a user does not generally hold a writing implement at right angles to the tablet being written upon, the coil is not always directly over the tip of the implement. The tilt of the implement may thus introduce some error in the position detection. To deal with this problem, position indicating implements are being provided with two electric coils each being supplied with distinguishable currents. A digitizing tablet senses the position of each of the coils and calculates the position of the tip of the implement from the two sets of position data.

It is an object of the present invention to provide a two-coil position indicating implement that requires only a single power source. It is a further object of the present invention to provide a current to each of the coils with a predetermined phase shift between them. The present invention further provides means for monitoring the phase shift between the currents in the two coils.

It is a still further object of the present invention to provide an alternating current power source having an accurately maintained phase relationship. It is a still further object of the present invention to provide a position indicating implement that can indicate in three dimensions.

In the realm of personal computers and electronic video games, a mouse for controlling the video display screen has become a common item. A mouse, as the term is used herein, is a hard manipulated object which provides relative position information. When a mouse is moved in a certain distance in a direction, it causes a cursor on the screen to move the prescribed distance in the desired direction. Alternatively, the mouse could cause the screen itself to move, thus displaying other areas of an electric work sheet which extends further than that which is able to be displayed on the screen. It is an object of the present invention that the position indicating implement may be easily switched for use as a mouse.

SUMMARY OF THE INVENTION

This invention is directed to a position indicating implement of the type for use in conjunction with a digitizing tablet system.

According to one embodiment of the implement of the present invention, a first coil is connected to a power source, a second coil is positioned so as to be inductively coupled with said first coil, and a capacitor is connected in series with the second coil so that the current in the first coil induces a phase shifted current in the second coil.

According to a second aspect of the present invention, the position indicating implement includes two coils having distinguishable alternating currents passing therethrough. A barrel houses the two coils. A tip extends from one end of the barrel for placement on and movement over a digitizing tablet and a switch easily accessible to a user's finger is located near the tip of the implement for producing a signal upon activation.

According to another aspect of the present invention, digital switch circuitry is provided for producing a step function for approximating a sine wave. The step function lacks any components at the second, third, fourth, fifth and sixth harmonics of the fundamental. A filter produces a sine wave from the step function and delivers the sine wave to a first coil. A simple filter can filter the seventh and ninth harmonics thereby enabling accurate maintenance of the sine wave's phase relationship. The position indicating implement includes a second coil which has a current distinguishable from the current in the first coil.

According to the presently preferred embodiment of the present invention, all of these features are incorporated within the position indicating implement. The digital switch circuitry producing a step function which lacks components at the second, third, fourth, fifth and sixth harmonics supplies its step function to a filter which produces a sine wave. The sine wave is delivered to a first coil. A second coil is positioned so as to be inductively coupled with the first coil. A capacitor is connected in series with the second coil so that the current induced in the second coil is phase shifted from the current in the first coil. A barrel houses the first and second coils and the capacitor. A tip extends from one end of the barrel for placement on and movement over a digitizing tablet. A mouse switch is located near the tip so that it may be easily activated by the finger of a user. Activation of the mouse switch causes the position indicating implement to operate as a mouse so that it indicates relative position rather than absolute position.

The position indicating implement of the present invention advantageously provides a phase shifted current in a second coil without requiring two separate current sources. The present invention further provides a switch which may be easily activated by a user's finger while writing with the implement. The power source of the present invention advantageously provides an AC signal having an accurately maintained phase. It is a further advantage of the present invention that the position indicating implement may be used as a mouse to indicate relative position in addition to being an absolute position indicator.

Other objects and advantages of the invention will become apparent during the following description of the presently preferred embodiments of the invention taken in conjunction with the drawings.

BRIEF DESCRIPTION OF THE DRAWINGS

FIG. 1 is a simplified view of a digitizing tablet system including the position indicating implement of the present invention;

FIG. 2 is a cross-sectional view of the position indicating implement of the present invention;

DETAILED DESCRIPTION OF THE PREFERRED EMBODIMENTS

Figure 3:
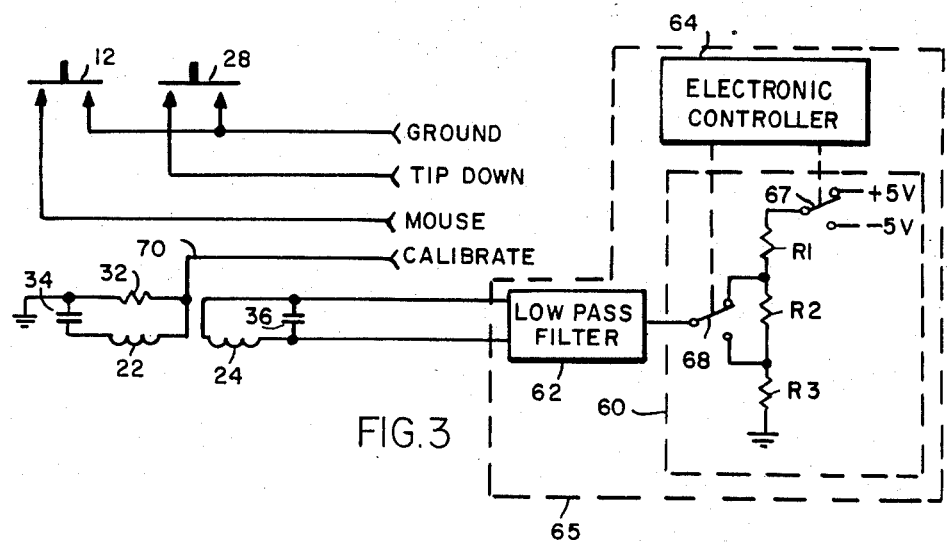
FIG. 3 is an electrical schematic of the position indicating implement of the present invention.

Turning now to the drawings, FIG. 1 illustrates a digitizing tablet system 11. The system 11 includes a digitizing tablet 13, a position indicating implement 10 and associated electronics 14. The digitizing tablet 13 generally contains a grid of conductive wires or wire loops which detect the location of the position indicating implement through measuring the induced currents in the grid. The electronics 14 evaluate and process the induced current information to provide useful data to a computer or a display. The electronics 14 may also include an alternating current power supply which provides current to the position indicating implement 10 through a cable 18. A more detailed description of a digitizing tablet and associated electronics for use with the present invention is described in copending U.S. patent application Ser. No. 585,711, now U.S. pat. 4,577,057, assigned to the same assignee as the prevent invention and having issued on Mar. 18, 1986 as U.S. Pat. No. 4,577,057. The disclosure of U.S. Pat. No. 4,577,057 entitled "Digitizing Tablet System having Stylus Tilt Correction" and is hereby incorporated by reference herein.

A mouse switch 12 is located near the tip 16 of the indicating implement 10. It can be seen that a user holding the implement 10 in a normal writing position can easily access the mouse switch with a finger. In the preferred embodiment, the mouse switch 12 is used to change the position indicating implement from an absolute position indicator to a relative positive indicator. In other words, the implement 10 would act as a mouse. Thus, when the implement 10 is moved a distance in a certain direction over the digitizing tablet 13, information will be sent by the electronics 14 to the computer or the display to move either the screen or the cursor on the screen the desired distance in the desired direction. The particular response caused by the mouse movement is determined by the particular software application package being used. Some software packages move the cursor while other packages move the display screen over a larger electronic worksheet. It is also possible that by moving a cursor to the end of the screen that continued attempts to move the cursor against the edge would cause the screen to move. The mouse switch 12 is used to enter and to leave the mouse mode of operation. Although the preferred embodiment uses switch 12 as a mouse switch, it would be possible to use this advantageously positioned switch to provide a signal to the electronics 14 which may have other useful meanings depending upon the needs of the particular software application program. For example, the switch 12 may be used in a character recognition system as a shift key similar to that in a typewriter to cause selected letters to be capitalized.

Referring now to FIG. 2, the structure of the position indicating implement 10 may be described in detail. The implement 10 includes a barrel 20 which houses an upper first coil 24, a lower second coil 22, a writing cartridge 26, a tip down switch 28 as well as a number of other electrical components, including resistor 32 and capacitors 34 and 36. If one ignores the electronics the position indicating implement 10 is simply a pen having a tip 16 for placement on and movement over the digitizing tablet 13. A sheet of paper may be placed over the digitizing tablet 13 so that movement of the implement 10 over the tablet and sheet of paper causes the cartridge 26 to write on the sheet of paper. The cartride 26 may be a ballpoint pen ink cartridge, a felt tip pen cartridge or other similarly functioning refill cartridge. The barrel 20 has two parts an upper half 21 and a lower half 19. The upper half 21 screws onto the lower half 19 at their respective threaded portions 23.

The writing cartridge 26 is mounted within the barrel 20 so that it may be moved in a longitudinal direction within the barrel. At the end of the writing cartridge 26 opposite the tip 16 is a plunger 42. A spring 44 is located around the plunger 42 and is butted against a shoulder 46 in the barrel 20. The spring 44 exerts force against the plunger 42 to push the writing cartridge 26 and tip 16 in a direction outwards from the barrel 20. A shoulder 48 in the barrel 20 stops the plunger 42 and thus the cartridge 26 connected thereto from being pushed any farther out of the barrel 20. The rear of the plunger 42 butts against a tip down switch 28. When a user writing with the implement 10 applies the tip 16 against the digitizing tablet 13 pressure is exerted through the cartridge 26 and against the spring 44 pushing the plunger 42 backwards into the tip down switch 28. The tip down switch 28 may be electrically connected in any of a number of ways. The preferred way is to use switch 28 as an on/off switch. This is illustrated in FIG. 3. When the implement 10 is being used it must be pushed against the digitizing tablet 13 to force the tip 16 in the direction of the barrel 20 to activate the tip down switch 28. When the switch is activated electronics 14 will receive a signal indicating that it should begin processing position indicating information.

The mouse switch 12 which was previously described is shown in greater detail in FIG. 2. Metal contacts 52 and 54 are located beneath a rubber switch cap 56. Pressure may be applied against the rubber cap 56 by the user's finger to cause the contacts 52 and 54 to touch one another thus sending a signal back to the electronics 14. In the present embodiment, the signal is sent through a wire 40 which travels the length of the barrel 20 and is connected to wires carried by cable 18. It may be possible however to provide a cordless implement with a transmitter which can send a signal to the electronics 14 without the need for a cable.

The position indicating elements of the implement 10 are the two coils 22 and 24. The geometries of the two coils may be determined by one skilled in the art. The two coils are positioned so that they inductively couple one another. In other words, the coefficient of coupling between the two coils is greater than zero. It is generally preferred that the two coils be positioned coaxially. The electric fields which are produced by the coils are determined by the geometry of the coils. The heights, widths and diameters of the coils are major factors in determining the electric fields which result. Also, the writing cartridge 26 positioned at the axis of the two coils may alter the fields if it is metallic. The coils are wound around a bobbin 38 which keeps the coils securely positioned within the implement 10.

In accordance with a presently preferred embodiment of the present invention, the lower coil 22 is conical to improve the field characteristics. The outer upper diameter of the lower coil 22 is 0.292 inches and the outer lower diameter of the lower coil 22 is 0.25 inches. The inner upper diameter of the lower coil 22 is 0.192 inches and the inner lower diameter of the lower coil 22 is 0.15 inches. The outer diameter of the upper coil is 0.3 inches and the inner diameter of the upper coil is 0.15 inches. The lower coil is 0.4 inches in length and the upper coil 24 is 0.15 inches in length. The center of the lower coil 22 is 0.437 inches above the tip 16 and the center of the upper coil 24 is .0752 inches above the tip 16.

Referring now to the remaining figures, the electronics of the position indicating implement will be discussed in greater detail. It is the object of digitizing tablet system to follow the position of the tip 16 of the position indicating implement. If only one coil is used by the position indicating implement 10 it becomes difficult to locate the position of the tip 16 because of the general practice of users of such an implement to tilt the implement 10 while writing. Therefore, it is advantageous to use two coils which induce currents in the tablet grid which can be distinguished. This produces two sets of data which can be used to accurately locate the position of the tip 16.

One method of providing two distinguishable currents to the coils is to use two different alternating current power sources. Another method is to provide a switch which alternates the supply from a single current source between the two coils, switching from one coil to the other. Switching encounters problems caused by the coils which act as inductors and therefore cannot be switched on and off instantaneously. Residual currents take time to dissipate. The preferred method of the present invention for providing the two coils with distinguishable currents requires only a single alternating current power source 65 and avoids the problems of switching.

Figure 4:
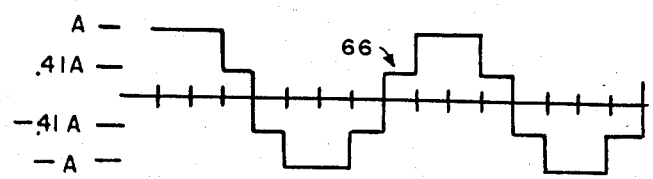
FIG. 4 is a graph depicting a step function produced by the digital switching circuit of the present invention.

The alternating current power source 65 includes a digital switching circuit 60 and a low pass filter 62. The digital switching circuit 60 is operated by an electronic controller 64 which generally comprises a microprocessor unit. The digital switching circuit 60 as controlled by the controller 64 produces a step function 66 as shown in FIG. 4. The digital switching circuit includes one switch 67 which switches between a positive and a negative voltage level. Resistors R1, R2 and R3 form a voltage divider so that a second switch 68 may be used to switch between an amplitude A and an amplitude which is approximately 0.41 times the value of A. When switch 67 is connected to the negative voltage level, second switch 68 makes the choice between a level of −A and −0.41A.

The step function 66 produced by the digital switching circuit 60 is a sine wave approximation having eight equally spaced states. The voltage values resulting from the voltage divider are selected such that they are samples of a sine wave. The resulting sine wave approximation 66 has no components in the second, third, fourth, fifth or sixth harmonics of the fundamental. A square wave has no even harmonics. The step function 66 also lacks any even harmonics. Its advantage lies in the fact that it also lacks any third or fifth harmonics. Thus it is much easier to filter. A simple low pass filter 62 removes the seventh and ninth harmonics without detrimentally affecting the phase of the sine wave being produced. In the present system, the accuracy of the phase must be maintained to precisely distinguish between the two coils and accurately make corrections for tilt of the indicating implement 10. The sine wave produce through the low pass filter 62 is delivered to the upper coil 24.

An optional capacitor 36 is provided across the coil 24 in order to reduce the current that must be provided by the power source 65. The preferred power source 65 is a voltage source. The current produced in the upper coil 24 must be inferred from the expected phase shift between the source and the coil which will be about 90°. To obtain accurate phase information, the phase shift can be accurately determined or a calibration line can be connected to the upper coil circuit. The use of a calibration line is discussed in greater detail below for the lower coil circuit. An alternate power source 69 would be a current source. The optional capacitor 36 should be connected in series with the upper coil 24 when used in conjunction with the current source. In this manner, the capacitor reduces the voltage which the current source must provide.

The phase controlled current in the upper coil 24 induces a current in the lower coil 22. Rather than provide the lower coil with its own source of current, the induced current is used in the present invention. A resistor 32 is provided in series with lower coil 22 to limit the current. The value of resistor 32 in the lower coil circuit determines the ratio of the amplitudes of the currents in the two coils 24 and 22. It is preferable that the value of resistor 32 be selected so that the electric field contribution of each of the two coils is approximately equal at the tablet 13.

A capacitor 34 is connected in series with the lower coil 22 and resistor 32 for the purpose of shifting the phase of the induced signal. Preferably, the capacitor 34 has a value such that it shifts the phase of the induced current 90°. This is achieved if the capacitor has a capacitive reactance which equals the inductive reactance of the lower coil 22. It is possible however for the electronics 14 to process the two sets of position data despite a phase shift other than 90°, provided the phase shift is known. If the values of the components are known the amount of phase shift can be predetermined. Variations may occur, however, as a result of the tolerance range in component values and changes in values which may occur over time. Thus, one improvement which may be added to the capacitor 34, resistor 32 and lower coil 22 is a calibration line 70. One end of the resistor 32 is tied to ground and the other end of the resistor is connected to the calibration line 70. The calibration line 70 is connected through cable 18 to the electronics 14. The voltage level across the resistor 32 corresponds to the current passing through the coil 22 and thus provides the electronics 14 with an accurate value of the phase of the current in coil 22 so that it can be compared to the phase of the current in coil 24. The current going through coil 24 is provided through low pass filter 62. The low pass filter 62, the digital switching circuit 60 and the electronic controller 64 may all be contained within the electronics 14. Then the electronics 14 would have direct access to the current traveling through the upper coil 24.

It is possible for the low pass filter 62, the digital switching circuit 60 and the electronic controller 64 to be contained within the barrel 20 of the position indicating implement 10. This obviates the need for a cable 18 and results in a cordless position indicator. Of course, this would prevent the inclusion of a calibration line 70. The system would have to rely on the predetermined phase shift between the current signals expected in accordance with the values of the capacitor 34 and the inductance of the coil 22. Unfortunately, changes in these values would not be detected without a calibration line 70. Thus, minor errors may be introduced into such a system.

Figure 5:
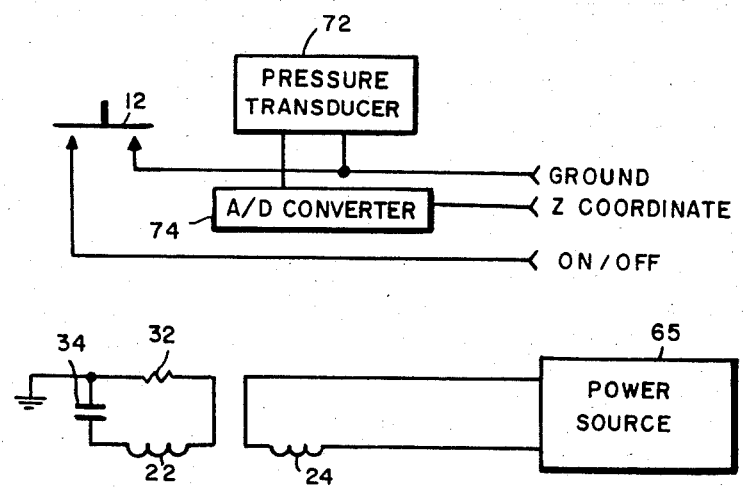
FIG. 5 is an electrical schematic of a second embodiment of the position indicating implement of the present invention.

According to a second embodiment of the present invention, the tip down switch 28 may be removed and replaced with a pressure transducer 72, as illustrated in FIG. 5. The pressure transducer 72 is activated by pressure created by the plunger 42 as a result of pressure on the tip 16 caused by the user pressing the implement 10 against the digitizing tablet 13. The harder one presses the implement 10 against the digitizing tablet the more pressure would be exerted through tip 16 back into the plunger 42 and against a pressure transducer 72. The pressure information produced by transducer 72 is digitized by an analog to digital converter 74. This digital pressure data is given to the electronics 14 so that it can analyze one more variable. The pressure information received from the transducer 72 may be used as a "z" component. Since the digitizing tablet is used to track the x-y coordinates of the tip 16, the addition of a "z" coordinate may be used to give the implement 10 the ability to indicate positions in three dimensions. Since the prior function of the tip down switch 28 has been lost it is possible as shown in FIG. 5 to use the switch 12 as an on/off switch rather than a mouse.

Figure 6:
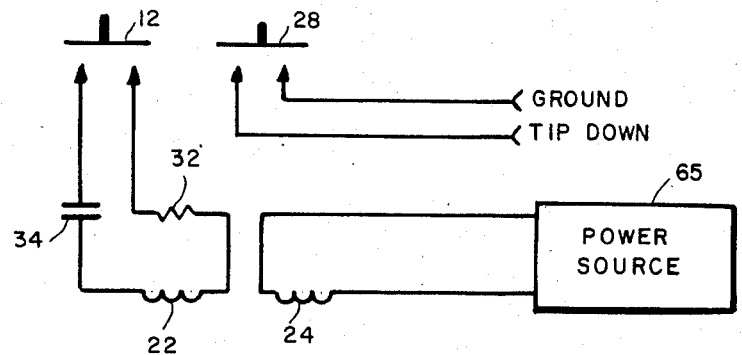
FIG. 6 is an electrical schematic of a third embodiment of the position indicating implement of the present invention.

According to a third embodiment of the present invention illustrated in FIG. 6 remote signaling is possible. Remote signalling avoids the need for an extra signalling wire in cable 18. The mouse switch 12 may be connected in series with the circuit of the lower coil 22. In the closed position, the mouse switch 12 allows a current to be induced in coil 22. In the open position, the mouse switch 12 breaks the circuit containing coil 22 thereby preventing a current from being induced in the coil. The digitizing tablet 13 can recognize the loss of the second field. This can be interpreted by the electronics 14 to indicate that a signal has been sent by the mouse switch 12. Thus signals from the remaining field produced by upper coil 24 could be used to produce directional information so that the implement 10 may act as a mouse. Alternatively, the signal caused by switch 12 could be given some other arbitrarily defined meaning. By placing the switch in the circuit of the lower coil 22 it is possible to signal the electronics 14 without providing an extra wire through the cable 18.

Figure 7:
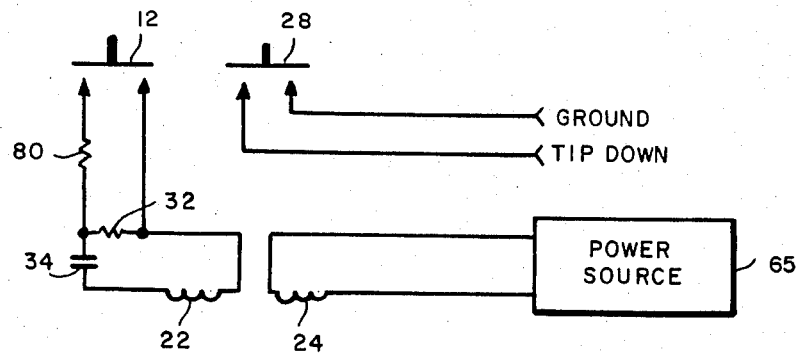
FIG. 7 is an electrical schematic of a fourth embodiment of the position indicating implement of the present invention.

Remote signaling may be accomplished in a variety of ways. Any circuit which allows a switch to alter the amplitude of the current in the lower coil 22 may be used. One of these ways is to provide a shunt resistor 80 as shown in FIG. 7. Here, in the open position of the switch 12 a normal field strength is produced by the second coil 22. When the switch 12 is closed the shunt resistor 80 reduces the resistance in the lower coil circuit and thus a larger current is induced. The field strength produced by coil 22 is noticeably increased. The relative increase in field strength from coil 22 with respect to the field from coil 24 is recognized by the digitizing tablet system and could be understood as a remote signal.

Embodiments of the present invention are intended to be merely exemplary and those skilled in the art shall be able to make numerous variations and modifications to them without departing from the spirit of the present invention. All such variations and modifications are intended to be within the scope of the present invention as defined in the appended claims.

We claim:

1. A position indicating implement comprising:
 a first coil;
 an alternating current power source connected to said first coil to produce a current in said first coil;
 a second coil positioned so as to be inductively coupled with said first coil; and
 a capacitor connected in series with said second coil so that the current in said first coil induces a phase shifted current in said second coil.

2. The position indicating implement of claim 1 further comprising a resistor connected in series with said capacitor and said second coil so that the electric field contribution of said first coil is approximately the same magnitude as the electric field contribution of said second coil at a digitizing tablet being used to detect the position of said implement.

3. The position indicating implement of claim 1 wherein said capacitor causes the induced current in said second coil to be shifted 90° from the current in said first coil.

4. The position indicating implement of claim 1 wherein said capacitor includes a capacitive reactance which is equal to an inductive reactance of said second coil.

5. The position indicating implement of claim 1 wherein said second coil is positioned coaxially with said first coil.

6. The position indicating implement of claim 1 further comprising a resistor connected in series with said second coil, one end of said resistor being tied to ground and the other end being connected to a calibration line by which the actual phase of the current in said second coil can be obtained for comparison with the phase of the current in said first coil.

7. The position indicating implement of claim 1 further comprising a switch coupled to said second coil enabling a user to alter the amplitude of the current in said second coil.

8. The position indicating implement of claim 7 wherein said switch is connected in series with said second coil so that the current in said second coil may be switched off.

9. The position indicating implement of claim 7 further comprising a shunt resistor coupled with said switch so that the amplitude of the current in said second coil is altered in response to said switch.

10. The position indicating implement of claim 1 further comprising:
  a barrel for housing said first and second coil;
  a tip extending from one end of said barrel for placement on and movement over a digitizing tablet; and
  switch means near said tip so that a signal may be created by activating said switch means with a user's finger which is also positioned near said tip when holding said implement.

11. The position indicating implement of claim 10 wherein said switch means causes a mouse signal to be created which changes said implement from an absolute position indicator to a relative position indicator.

12. The position indicating implement of claim 1 further comprising:
  a barrel for housing said first and second coil;
  a tip extending from one end of said barrel, for placement on and movement over a digitizing tablet;
  a spring for applying force against said tip in a direction outwards of said barrel; and
  a pressure transducer for measuring the force applied against said tip in a direction into said barrel.

13. The position indicating implement of claim 12 wherein said pressure transducer includes means for generating signals that indicate position in one component of a three dimensional position indicating system.

14. The position indicating implement of claim 1 wherein said current source includes digital switching means for producing a sine wave approximation which has no components at the second, third, fourth, fifth or sixth harmonics and a filter for producing a sine wave from said sine wave approximation.

15. The position indicating implement of claim 1 wherein said current source includes digital switching means for producing a sine wave approximation that is a step function alternating between approximate values of A, 0.41A, −0.41A and −A, where A equals the amplitude of the sine wave approximation, and a filter for producing a sine wave from said sine wave approximation.

16. A position indicating implement comprising:
  a first coil having a first alternating current passing through it;
  a second coil having a second alternating current distinguishable from said first alternating current passing through it;
  a barrel which houses said and second coils;
  a tip extending from one end of said barrel for placement on and movement over a digitizing tablet; and
  a switch mounted on said barrel so that it is easily accessible to a user's finger near said tip for producing a signal upon activation by said finger, said signal causing said implement to operate as a mouse, so that said implement indicates relative position rather than absolute position.

17. The position indicating implement of claim 16 further comprising a pressure transducer for measuring the force applied against said tip in a direction into said barrel.

18. The position indicating implement of claim 17 wherein said pressure transducer includes means for generating signals that indicate position in one component of a three dimensional position indicating system.

19. A position indicating implement comprising:
  a first coil;
  digital switch means for producing a step function approximating a sine wave, said step function lacking components at the second, third, fourth, fifth and sixth harmonics;
  means for filtering said step functions to produce a sine wave which is delivered to said first coil; and
  a second coil having a current distinguishable from the current in said first coil.

20. The position indicating implement of claim 19 further comprising a capacitor connected in series with said second coil and wherein the current in said second coil is induced by and phase shifted from the current in said first coil.

21. The position indicating implement of claim 20 wherein said capacitor causes the induced current in said second coil to be shifted 90° from the current in said first coil.

22. The position indicating implement of claim 20 wherein said capacitor includes a capacitive reactance equal to an inductive reactance of said second coil.

23. The position indicating implement of claim 21 further comprising a resistor connected in series with said second coil, one end of said resistor being tied to ground and the other end being connected to a calibration line by which the actual phase of the current in said second coil can be obtained for comparison with the phase of the current in said first coil.

24. The position indicating implement of claim 20 further comprising a switch coupled to said second coil for enabling a user to alter the current in said second coil.

25. The position indicating implement of claim 24 wherein said said switch is connected in series with said second coil so that the current in said second coil may be switched off.

26. The position indicating implement of claim 24 further comprising a shunt resistor coupled with said switch so that the amplitude of the current in said second coil is altered in response to said switch.

27. The position indicating implement of claim 19 further comprising:
  a barrel for housing said first and second coil;
  a tip extending from one end of said barrel for placement on and movement over a digitizing tablet; and
  switch means near said tip so that a signal may be created by activating said switch means with a user's finger which is also positioned near said tip when writing.

28. The position indicating implement of claim 27 wherein said switch means causes a mouse signal to be created which changes said implement from an absolute position indicator to a relative position indicator.

29. The position indicating implement of claim 19 further comprising:
  a barrel for housing said first and second coil;
  a tip extending from one end of said barrel, for placement on and movement over a digitizing tablet;
  a spring for applying force against said tip in a direction outward of said barrel; and
  a pressure transducer for measuring the force applied against said tip in a direction into said barrel.

30. The position indicating implement of claim 29 wherein said pressure transducer includes means for generating signals that indicate position in one component of a three dimensional position indicating system.

31. A position indicating implement comprising:
  a first coil;
  digital switch means for producing a step function approximating a sine wave, said step function lacking components at the second, third, fourth, fifth, and sixth harmonics;

means for filtering said step function to produce a sine wave which is delivered to said first coil;

a second coil positioned so as to be inductively coupled with said first coil;

a capacitor connected in series with said second coil so that said current in said first coil induces a phase shifted current in said second coil;

a barrel for housing said first and second coils and said capacitor;

a tip extending from one end of said barrel for placement on and movement over a digitizing tablet; and a mouse switch near said tip so that it may be easily activated by the finger of a user holding said barrel, activation of said switch producing a mouse signal which causes said implement to operate as a mouse so that it indicates relative direction rather than absolute position.

32. The position indicating implement of claim 31 further comprising a resistor connected in series with said second coil, one end of said resistor being tied to ground and the other end being connected to a calibration line by which the actual phase of the current in said second coil can be obtained for comparison with the phase of the current in said first coil.

33. The position indicating implement of claim 31 further comprising a switch coupled to said second coil for enabling a user to alter the current in said second coil.

34. The position indicating implement of claim 31 further comprising a pressure transducer for measuring the force applied against said tip in a direction into said barrel so that said implement indicates position in three dimensions.

* * * * *